May 19, 1942.  V. G. KLEIN ET AL  2,283,638
INJECTOR
Filed Aug. 12, 1940  3 Sheets-Sheet 1
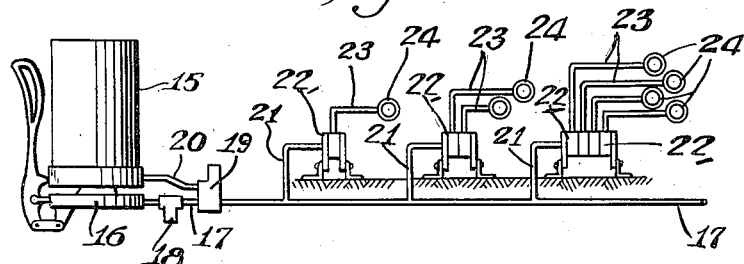
Fig. 1.
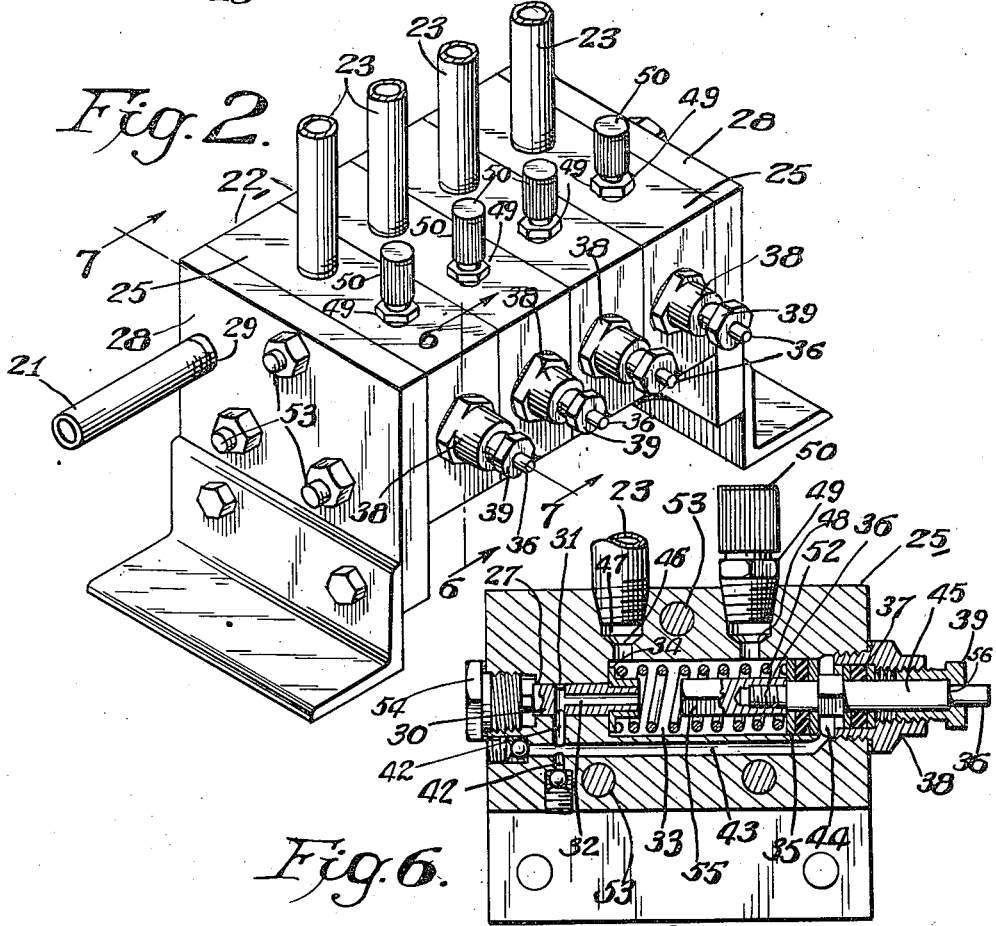
Fig. 2.
Fig. 6.
INVENTORS:
Victor G. Klein
Lutwin C. Rotter
BY
Leonard L. Kalish
ATTORNEY.

May 19, 1942.  V. G. KLEIN ET AL  2,283,638
INJECTOR
Filed Aug. 12, 1940  3 Sheets-Sheet 2
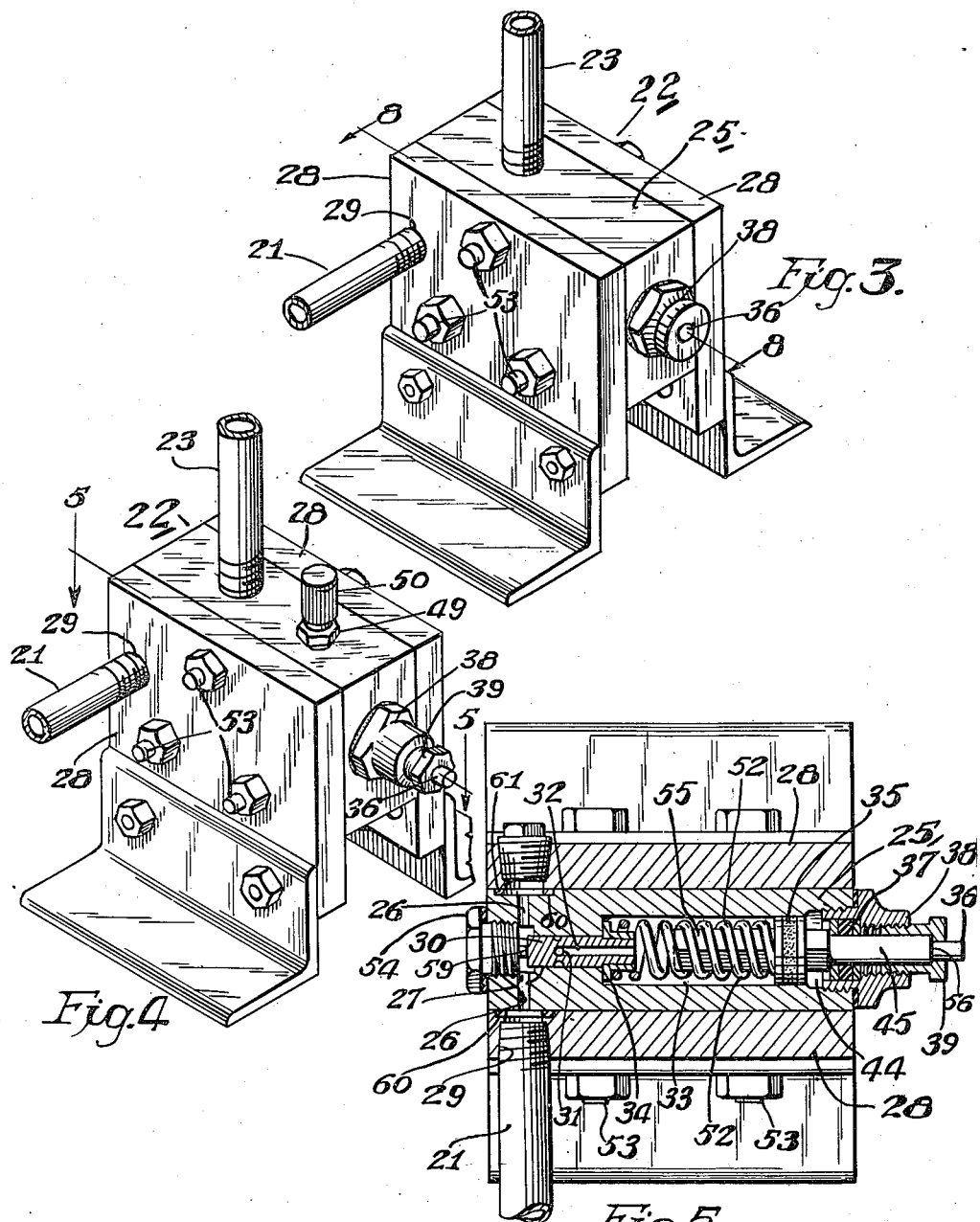
INVENTORS:—
Victor G. Klein
Lutwin C. Rotter
BY
Leonard L. Kalish
ATTORNEY.

May 19, 1942.  V. G. KLEIN ET AL  2,283,638
INJECTOR
Filed Aug. 12, 1940   3 Sheets-Sheet 3
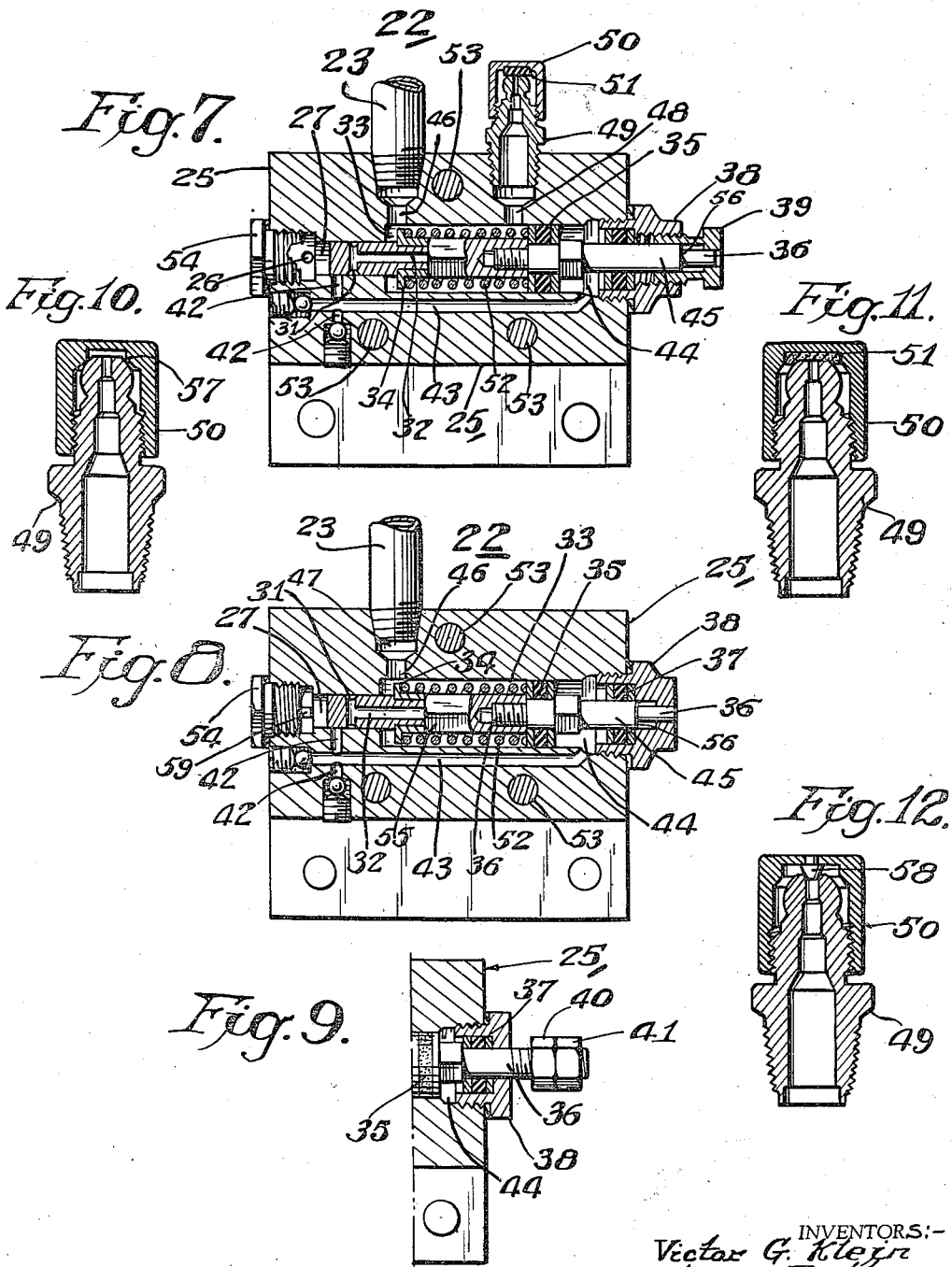
INVENTORS:-
Victor G. Klein
Lutwin C. Rotter
BY
Leonard L. Kalish
ATTORNEY.

Patented May 19, 1942

2,283,638

UNITED STATES PATENT OFFICE 2,283,638

INJECTOR

Victor G. Klein, St. Louis, and Lutwin C. Rotter, Maplewood, Mo., assignors to Lincoln Engineering Company, St. Louis, Mo., a corporation of Missouri Application August 12, 1940, Serial No. 352,294

10 Claims. (Cl. 184—7)

This invention relates to injectors and more particularly to pressure lubricating apparatus and the like.

An object of this invention is to provide an injector for use in lubricating systems which is inexpensive, simple in construction, and positive and efficient in operation.

Another object of this invention is to increase the flexibility of a lubricating system by providing means for adjusting the amounts of grease delivered by individual injectors.

Still another object of this invention is to provide means for delivering extra grease to individual bearings when required.

Another object of this invention is to provide means for accurately gauging the amount of grease being delivered.

Other objects and purposes are apparent in the following specifications and claims and the accompanying drawings.

The injectors now in use, such as the one described in the patent to Klein No. 2,122,177 employ die castings or other castings and are generally complicated and expensive in construction.

The present invention provides a simple and inexpensive device which has fewer parts and more positive and dependable operation.

The present invention may be used in lubrication systems such as the one described in the patent to Rotter No. 2,141,022 or any other appropriate system.

For the purpose of illustrating the invention, there are shown in the accompanying drawings forms thereof which are at present preferred, since the same have been found in practice to give satisfactory and reliable results, although it is to be understood that the various instrumentalities of which the invention consists can be variously arranged and organized and that the invention is not limited to the precise arrangement and organization of the instrumentalities as herein shown and described.

Referring to the drawings in which similar reference characters indicate corresponding parts throughout.

Figure 1 is a diagrammatic representation of one type of system in which the present invention may be used.

Figure 2 represents a perspective view of a manifold of injector units each unit having a single grease outlet and the manifold having a common grease inlet.

Figure 3 represents a perspective view of one form of injector constructed in accordance with the present invention.

Figure 4 represents a perspective view of a preferred embodiment of this invention in which a fitting has been placed in the block and in which adjusting means has been added.

Figure 5 represents a horizontal cross-sectional view along the line 5—5 of Figure 4.

Figure 6 represents a vertical cross-sectional view along the line 6—6 of Figure 2 showing the plungers in low pressure position for a new cycle of operation.

Figure 7 represents a vertical cross-sectional view along the line 7—7 of Figure 2 showing the plungers in a high pressure position somewhat before the termination of the pressure-actuated stroke.

Figure 8 represents a vertical cross-sectional view along the line 8—8 of Figure 3 showing the plungers in high pressure position.

Figure 9 represents a fragmentary cross-sectional view of an adjusting means alternative to that shown in Figures 5, 6 and 7.

Figure 10 represents an enlarged cross-sectional view of a fitting which can be placed in the block, showing one form of removable cap which closes the fitting by sealing on the ball end of the fitting.

Figure 11 represents a view similar to that of 10 in which an alternative form of removable cap having a gasket seal is used.

Figure 12 represents a view similar to that of 10 in which still another form of removable cap having a conical seating member for sealing the fitting is used.

Referring now more particularly to Figure 1, there is shown a container 15 for lubricant. Associated with the lower and outlet end of the container 15 is a pump 16 which withdraws lubricant from the container 15 and discharges it to a line 17. In the line 17 is a strainer 18. Said line 17 also includes a relief valve 19 having a by-pass line 20 to the container 15. The details and functions of similar parts have been described in detail in the patent to Rotter No. 2,141,022. A relief valve suitable for use at 19 is described in the patent to Rotter No. 2,162,893.

Communicating with the line 17 by way of short branch lines 21, 21 are injectors 22, 22 which receive lubricant from the line 17 through the branch lines 21 or through the manifold construction shown in Figure 2. Each injector has its outlet line 23 connected with a suitable bearing or bearings 24 to be lubricated. All of the above items are shown diagrammatically in Figure 1 for the purpose of showing the use of the specific injector shown in the remaining figures.

The pump 16 may be any suitable type of electric or hand-operated or air-driven pumping means such as, for example one shown in the patents to Barks 1,704,238; 1,801,259 and 1,858,979.

The pump 16 is operated manually or automatically as desired, and sends lubricant under pressure through the line 17. This applies pressure to the injectors via the branch lines 21. The object of the injectors 22 is to permit of forcing measured charges of lubricant from them to the bearings 24 simply by operating the pump and without the necessity for an operation of a predetermined interval of time.

Referring now more particularly to Figures 2 to 9, the block or body portion 25 has a horizontal drilled port 26 extending transversely from side to side and connecting with a longitudinal opening 27. On either side of a unit if to be used singly or of a manifold of units as shown in Figures 3 and 2 respectively are fastened end plates 28 having threaded inlet openings 29 which coincide with the port 26 so that one of said inlet openings can be plugged and the other connected to the main grease line 17 or a branch line 21.

The valve 30 is slidably mounted in the opening 27 and contains a port 31 and a connecting axial duct 32 which leads to the cylinder 33. On the inner end of the valve 30 is the spring seat 34. A coil spring 52 is mounted in the cylinder 33 and presses against the seat 34 and a piston 35. A guide stem 36 passes through the piston 35 and terminates in a nut 55 inside the cylinder and extends outside the body of the ejector through the packing 37 which is held in place by the drilled retainer nut 38. This retainer 38 may be plain as shown in Figures 8 and 9 or may be threaded to receive an adjusting nut 39 as in Figures 5, 6 and 7. The protruding guide stem 36 may also be threaded to receive two adjusting nuts 40 and 41 as shown in Figure 9.

A duct 42 extends from the opening 27 and connects with a drilled passageway 43 which opens into the chamber 44 beyond the piston 35. The guide stem 36 may also be provided, as shown in Figures 5, 6, 7 and 8, with a shoulder 56 to limit its outward travel, which is formed by having the inner portion 45 of the stem 36 of a diameter greater than that of the extremity of said stem. The shoulder 56 may also be formed by fitting a sleeve 45 about the guide stem 36. A duct 46 is drilled in the block 25 communicating with the cylinder 33 and terminates in the threaded grease outlet 47 to which is attached the outlet line 23 leading to the bearing 24 to be greased. Another duct 48 may be added as in Figures 6 and 7 also communicating with the cylinder 33 and is threadedly adapted to receive the fitting 49 which has a cap 50 with a gasket seal 51. Tie rods 53 hold a manifold of injectors together as shown in Figure 2. The threaded plug 54 is used to close the end of the opening 27, and has an abutment 59 which serves as a stop for the valve 30.

The piston 35 is one example of means for separating or dividing the chamber 33 into two chambers, the sizes of which are varied during operation of the apparatus. For example, a diaphragm may be used in place of the piston 35.

It is also to be understood that other means besides the spring 52 may be used for driving the piston 35 to transfer grease from one side to the other side thereof. Gravity, magnetic means or mechanical equivalents may be substituted.

In operation, starting with the parts of the injector in low pressure or recharging position as shown in Figure 6 and assuming that there is no pressure in the grease line 17, pressure is created in the lines 17 and 21 by the operation of the pump 16 forcing grease through the inlet opening 29 and into the port 26. If the injector is being used in a manifold grease will be forced into the ports 26 of the successive injectors so that the aligned ports 26 will act as a single inlet line. The grease under pressure enters the opening 27 and forces the valve 30 forward and beyond the duct 42. The grease thereupon enters the duct 42 and travels along connecting passageway 43 into the chamber 44 driving the piston 35 to the left, against the pressure of the spring 52.

The travel of the piston 35 is limited by the nut 55 striking against the valve 30. The spring seat 34 contacts the shoulder of the valve 30 so that the valve will be moved back to its starting position as shown in Figure 6 at the proper time. When the piston 35 has stopped moving, the continued operation of the pump 16 will raise the pressure in the closed system causing the unloader or relief or bleeder valve 19 to vent the line 17 by passing the grease through 20 to the container 15. If the pump is manually operated without the valve 19, the operator will simply stop pumping when the pressure gets too great.

When the line 17 is vented or the pump 16 is stopped, the pressure in the line and against the end of the valve 30 drops. As a result, the spring 52 drives the valve 30 back to the left starting position in which the port 31 aligns with the duct 42. This creates a free passage for the grease in the compartment to the right of the piston 35. The pressure of the spring 52 thereupon drives the piston 35 to the right forcing the grease back through the passageway 43 and the duct 42 into the port 31 and the connecting axial duct 32 and finally into cylinder 33 to the left of the piston 35. Thus, as a result of the pressure drop in the line 17, the grease in the injector has been transferred from the right to the left side of the piston 35.

The injector is now ready for the next cycle in which the unloader valve 19 reseats or the pump 16 is started manually. The pressure in the grease line 17 increases again and drives the valve 30 to the right beyond the duct 42, thereupon grease traverses the duct 42 and passageway 43 to the chamber 44 driving the piston 35 to the left. When the piston 35 now moves to the left, it drives the grease from the left hand end of the cylinder out through the duct 46 and outlet 47 into the outlet line 23 leading to the bearing 24 to be greased. When the piston 35 stops, the pressure mounts, the relief valve 19 again unloads and the new charge of grease is forced into the left compartment of the cylinder 33 as before and the injector is ready for a new cycle of operation.

By forming the shoulder 56, and adding the adjusting nut 39, as shown in Figures 5, 6 and 7, the return of the piston 35 to the right can be limited and thus the size of the grease charge injected can be regulated.

It is also possible to thread the protruding end of the guide stem 36 and, by means of a nut 40 or two nuts 40 and 41, limit the travel of the piston 36 to the left as shown in Figure 9 and thereby regulate the grease charge injected. However, the embodiment shown in Figures 5, 6 and 7 is preferred since the structure shown therein relieves the guide stem 36 of all strain except the negligible force of the spring 52. On the other hand, in the embodiment shown in Figure 9, the threads of the stem 36 must stop the piston 35 against the maximum pressure of the pump 16 and may break if not properly constructed and of sufficient strength.

It is preferred to add a duct 48 communicating with the outlet side of the cylinder 33 and to insert a fitting 49 having a removable top 50 and a gasket seal 51. Instead of having the gasket seal 51, as shown in Figure 11; the cap 50 may be formed with a circular shoulder 57 which forms a seal with the ball end of the fitting 49 as shown in Figure 10. The cap 50 can also be made with a conical seating member 58 which seals the orifice of the fitting 49 when the cap 50 is screwed tight. This fitting serves a dual purpose. It permits the introduction of additional grease to individual injectors of a manifold or system so that such bearings as require additional lubrication may be greased separately. The fitting also serves as a gauge for the amount of grease being delivered by the injector, for, if the cap 50 is removed, the operation of the injector will force the grease out at the fitting 49 rather than through the outlet line 23 due to the greater resistance offered by the latter.

The movement of the protruding end of the guide stem 36 serves to indicate that the injector is operating.

When a manifold of injector units, as shown in Figure 2, is used in which each injector has a single grease outlet and the manifold has a common grease inlet the passageway 27 of each injector is aligned with the passageway of the adjacent injector to form a continuous port. The mutually contacting sides of the several injectors are provided with similar, circular depressions 60 adjacent to the passageway 27 so that a metal washer 61 can be inserted into the cavity formed by two such coinciding depressions to form a tight seal therein.

The present invention may be embodied in other specific forms without departing from the spirit or essential attributes thereof, and it is therefore desired that the present embodiments be considered in all respects as illustrative and not restrictive, reference being had to the appended claims rather than to the foregoing description to indicate the scope of the invention.

While the block or body portion 25 is shown in the drawings as being generally rectangular in cross-section, it is, of course, possible to form said block or body portion 25 in other forms without, in any way, changing the operation of the injector of the present invention and without departing from the spirit of the present invention. Thus, the block or body portion 25 may be formed of round stock so that it is circular in cross-section.

The invention having thus been described, what is hereby claimed as new and desired to be secured by Letters Patent, is:

1. An injector comprising a body having an inlet for receiving lubricant under pressure and a cylinder, a piston disposed within said cylinder and dividing said cylinder into an intake chamber and a discharge chamber, an outlet for delivering lubricant under pressure communicating with said discharge chamber, a passageway coaxial with said cylinder and extending between said inlet and said discharge chamber, a valve having a passage therein slidably mounted within said passageway and projecting within said discharge chamber, said passage opening into said discharge chamber, a single conduit extending between said intake chamber and said passageway, a spring disposed within said discharge chamber and seated against said valve and against said piston and normally urging them in opposite directions to their respective outermost seated positions, in which the passage in said valve comes in registration with said single conduit and establishes communication between said single conduit and said discharge chamber, said valve presenting an area to pressure of grease at said inlet whereby said valve is moved to move the passage in said valve out of registration with said single conduit and thereby to cut off communication between said single conduit and said discharge chamber and to establish communication between said inlet and said single conduit.

2. An injector comprising a body having an inlet for receiving lubricant under pressure and a cylinder, a piston disposed within said cylinder and dividing said cylinder into an intake chamber and a discharge chamber, an outlet for delivering lubricant under pressure communicating with said discharge chamber, a passageway coaxial with said cylinder and extending between said inlet and said discharge chamber, a valve having a passage therein slidably mounted within said passageway and projecting within said discharge chamber, said passage opening into said discharge chamber, a single conduit extending between said intake chamber and said passageway, a spring disposed within said discharge chamber and seated against said valve and against said piston and normally urging them in opposite directions to their respective outermost seated positions, in which the passage in said valve comes in registration with said single conduit and establishes communication between said single conduit and said discharge chamber, said valve presenting an area to pressure of grease at said inlet whereby said valve is moved to move the passage in said valve out of registration with said single conduit and thereby to cut off communication between said single conduit and said discharge chamber and to establish communication between said inlet and said single conduit, a shoulder carried by said piston and an adjustable seating member for said shoulder; said piston having a pressure-actuated stroke of relatively constant and non-adjustable terminus and having a spring-actuated return stroke of variable and adjustable terminus defined by said adjustable seating member.

3. An injector including an inlet for receiving lubricant under pressure, a cylinder, a piston disposed within said cylinder and dividing said cylinder into an intake chamber and a discharge chamber, a single conduit leading from said intake chamber, valve means adapted alternatively to connect said single conduit with said discharge chamber or with said inlet, an auxiliary port communicating with said discharge chamber and means for making a quick-attachable and quick-detachable connection between said port and a source of lubricant under pressure whereby lubricant may be supplied directly to said discharge chamber without operation of said piston.

4. An injector including an inlet for receiving lubricant under pressure, a cylinder, a piston disposed within said cylinder and dividing said cylinder into an intake chamber and a discharge chamber, a single conduit leading from said intake chamber, valve means adapted alternatively to connect said single conduit with said discharge chamber or with said inlet, a spring disposed within said discharge chamber and seated against said piston and against said valve means thereby to urge them in opposite directions, a shoulder carried by said piston, an adjustable seating member for said shoulder; said piston having a pressure-actuated stroke of relatively constant and non-adjustable terminus during which lubricant is delivered to said intake chamber through said single conduit and discharged from said discharge chamber, said piston having a spring-actuated return stroke of variable and adjustable terminus defined by said adjustable seating member during which lubricant is transferred from said intake chamber to said discharge chamber through said single conduit.

5. An injector including a cylinder, a piston disposed within said cylinder and dividing said cylinder into an intake chamber and a discharge chamber, an inlet for receiving lubricant under pressure communicating with said intake chamber, an outlet for delivering lubricant under pressure communicating with said discharge chamber, an auxiliary port communicating with said discharge chamber and terminating in a nipple, and a cap removably sealing said nipple; said nipple being adapted to make a quick-attachable and quick-detachable connection to a source of lubricant under pressure whereby lubricant may be supplied to said outlet without operation of said piston.

6. An injector comprising a cylinder, a piston disposed within said cylinder and dividing said cylinder into an intake chamber and a discharge chamber, an inlet for receiving lubricant under pressure, an outlet for delivering lubricant under pressure communicating with said discharge chamber, a single conduit leading from said intake chamber, a valve adapted to connect said single conduit alternatively with said inlet for supplying lubricant under pressure to said intake chamber through said single conduit or with said discharge chamber for transferring lubricant from said intake chamber to said discharge chamber through said single conduit, said valve being normally spring-urged into position to connect said single conduit with said discharge chamber and being movable under pressure of lubricant at said inlet into position to connect said single conduit with said inlet, said piston having a pressure-actuated stroke of relatively constant and non-adjustable terminus during which lubricant is delivered to said intake chamber and ejected from said discharge chamber, said piston having a spring-actuated return stroke of variable terminus during which lubricant is transferred from said intake chamber to said discharge chamber through said single conduit, and means for varying the terminus of said spring-actuated return stroke thereby to vary the amount of lubricant delivered by said injector.

7. An injector comprising a cylinder, a piston disposed within said cylinder and dividing said cylinder into an intake chamber and a discharge chamber, an inlet for receiving lubricant under pressure, an outlet for delivering lubricant under pressure communicating with said discharge chamber, a single conduit leading from said intake chamber, a valve adapted to connect said single conduit alternatively with said inlet for supplying lubricant under pressure to said intake chamber through said single conduit or with said discharge chamber for transferring lubricant from said intake chamber to said discharge chamber through said single conduit, said valve being normally spring-urged into position to connect said single conduit with said discharge chamber and being movable under pressure of lubricant at said inlet into position to connect said single conduit with said inlet, said piston having a pressure-actuated stroke of relatively constant and non-adjustable terminus during which lubricant is delivered to said intake chamber and ejected from said discharge chamber, said piston having a spring-actuated return stroke of variable terminus during which lubricant is transferred from said intake chamber to said discharge chamber through said single conduit, means for varying the terminus of said spring-actuated return stroke thereby to vary the amount of lubricant delivered by said injector, an auxiliary port communicating with said discharge chamber and terminating in a nipple, and a cap removably sealing said nipple; said nipple being adapted to make a quick-attachable and quick-detachable connection to a source of lubricant under pressure whereby lubricant may be supplied to said outlet without operation of said piston.

8. An injector comprising a cylinder, a piston disposed within said cylinder and dividing said cylinder into an intake chamber and a discharge chamber, a conduit connecting said intake chamber and said discharge chamber, said piston having a pressure-actuated stroke of relatively constant and non-adjustable terminus and a spring-actuated return stroke of variable terminus, and means for varying the terminus of said spring-actuated return stroke thereby to vary the amount of lubricant delivered by said injector.

9. An injector comprising a cylinder, a piston disposed within said cylinder and dividing said cylinder into an intake chamber and a discharge chamber, a conduit connecting said intake chamber and said discharge chamber, said piston having a pressure-actuated stroke of relatively constant and non-adjustable terminus and a spring-actuated return stroke of variable terminus, and means for varying the terminus of said spring-actuated return stroke thereby to vary the amount of lubricant delivered by said injector, said means including a shoulder carried by said piston and an adjustable seating member for said shoulder.

10. An injector comprising a housing having a cylinder, a piston disposed within said cylinder and dividing said cylinder into an intake chamber and a discharge chamber, a conduit connecting said intake chamber and said discharge chamber for transferring lubricant from said intake chamber to said discharge chamber, said piston having a pressure-actuated stroke of relatively constant and non-adjustable terminus and a spring-actuated return stroke of variable terminus, an abutment supported by said housing for terminating said pressure-actuated stroke and adjustable means for terminating said spring-actuated return stroke, said adjustable means comprising a shoulder carried by said piston and an adjustable seating member for said shoulder.

VICTOR G. KLEIN.
LUTWIN C. ROTTER.